US005448816A

United States Patent [19]

Hill, Jr. et al.

[11] Patent Number: 5,448,816

[45] Date of Patent: Sep. 12, 1995

[54] TOOL AND METHOD FOR REMOVING HIGH HEEL TIPS

[75] Inventors: Lloyd R. Hill, Jr.; Lisa J. Hill, both of Santa Ana, Calif.

[73] Assignee: Adcor Products, Inc., Orange, Calif.

[21] Appl. No.: 239,219

[22] Filed: May 6, 1994

[51] Int. Cl.[6] .......... B23P 19/00

[52] U.S. Cl. .......... 29/426.5; 29/239; 29/267

[58] Field of Search .......... 29/426.4, 426.5, 239, 29/267, 268

[56] References Cited

U.S. PATENT DOCUMENTS 2,992,445 7/1961 Nelson .......... 29/267

5,102,100 4/1992 Troncoso, Jr. .......... 29/267

*Primary Examiner*—David P. Bryant

*Attorney, Agent, or Firm*—Hawes & Fischer

[57] ABSTRACT

This tool simply and easily removes the tip of a high heel shoe using a grasping tool which is engagable with a bracket. The bracket supports the shoe and, in particular, the heel in a snug, protected position. The support area of the bracket is shaped and covered to protect the heel and shoe from damage while the tip of the high heel is removed. The bracket provides an adjustable height fulcrum point for the grasping tool to pull the tip of the high heel, while the grasping tool provides an adjustable grasping ability to grasp both large and small tips.

19 Claims, 2 Drawing Sheets

TOOL AND METHOD FOR REMOVING HIGH HEEL TIPS

FIELD OF THE INVENTION

The present invention relates to the field of devices for shoe repair, and more specifically to a device comprised of a tool and support bracket which enables the tip of a high heel shoe to be removed with a minimum of effort to facilitate reliable inexpensive replacement of the heel tip.

BACKGROUND OF THE INVENTION

It is well-established that even a very small woman places an extraordinary amount of stress upon the tip of a high heel shoe. This is so well known that women are requested to remove high heel shoes when walking on certain wood surfaces. Even flooring such as cushioned vinyl flooring may be damaged by a woman walking in high heel shoes on its surface. This stress is not just experienced upon the floor, but the high heel tip itself quickly exhibits the stress by becoming damaged and worn. In addition, such surfaces as concrete and the texture of asphalt increases the damage to the high heel tip due to the hardness and the irregularities in those surfaces. Further, the shape and small surface area of high heel tips enables them to be subjected to tremendous torque-type grinding forces. As a result, the high heel tip is usually the first portion of a high heel shoe to wear out. The owner is faced with having to replace the shoes which can be a very expensive decision or having a repair shop replace the high heel tips which is inconvenient and also relatively expensive.

Some pairs of high heel shoes are sold with an extra heel of high heel tips. These tips are usually accompanied with instructions which suggest that the owner must go to a shoe repair shop to have the tips replaced. There is a great temptation to save the cost of the shoe repair shop and to personally replace the high heel tips. The removal of the worn high heel tip is the first, and most difficult step. Removal of the tip entails finding some way to brace the shoe without causing damage to the surface of the shoe, then pulling off the worn high heel tip. Most high heels are a tapered volume, but most grasping tools, such as vices, provide planar parallel grasping surfaces. The sides of the high heel are typically leather covered and have a surface which matches the shoe, and is easily marred.

The leather covering the high heel is typically thin and amenable to tearing. Bracing the shoe is virtually impossible with the usual home tools, and risks tearing the heel material. Even with a c-clamp or vice to brace the shoe, the leather of the shoe must be protected from the metal of these tools. The requirement to use some cushioning material is counterproductive to bracing the shoe securely with the c-clamp or vice or other appropriate gripping tool.

The next problem is the relatively small size of the tip. Because it is small, it presents only a small amount of surface area with which the worn tip must be grasped and pulled out. Further, and depending upon the degree of wear, the portion of the already small area of the high heel tip remaining after damage and wear may be even smaller. In some cases, the high heel tip is worn away completely and the central pin which was used to secure the high heel tip may be all that remains.

Under the above circumstances, if the high heel tip can be grasped at all, achieving sufficient leverage to remove it requires exceptional effort, and especially where only the central pin remains. Typically the central pin is smoothly sided and straight. There is no surface against which force can be developed to pull out the pin. The effort becomes an exasperating task.

Even in shoe repair shops which have the appropriate type of clamp for removing such pins, the repairman must use a rather large gripping tool and extraordinary amount of effort in which to remove the remaining tip. Even with large, specialized, and expensive tools, the force required is substantial, even for one skilled in shoe repair. This task is even more difficult for the consumer. Presently, efficient means for removing high heel tips in order to replace them with new tips is not available to consumers.

What is therefore needed is an inexpensive tool which will enable a wide variety of sizes of high heel tips, and tip securing structures such as pins to be easily removed, but with minimal physical exertion. The tool should be inexpensive enough for consumer purchase, and for the consumer's realization of substantial savings in avoiding the necessity of having the tips removed at a shoe shop.

SUMMARY OF THE INVENTION

This invention is directed to a tool for simply and easily removing the tip of a high heel shoe. The tool is comprised of grasping tool which is engagable with a bracket. The bracket supports the shoe and, in particular, the heel in a snug, protected position. The support area of the bracket is shaped and covered to protect the heel and shoe from damage while the tip of the high heel is removed. The bracket provides an adjustable height fulcrum point for the grasping tool to pull the tip of the high heel.

The grasping tool is adjustable to accommodate various high heel tip sizes. Once the heel of the shoe is on the support bracket, the grasping tool is inserted into one of the many slots which accommodate the distal end of that tool. The slot selected will position the grasping tool flush with the bottom of the high heel tip when the grasping tool is extended at approximately 90 degree angle from the slot in the support tool.

The grasping tool is comprised of two pieces which are hingedly connected near one end. As the bottom leg of the grasping tool is lowered the opening into which the high heel tip is received is enlarged to easily receive the high heel tip. The upper leg of the grasping tool has a recessed platform, on which the high heel tip rests. This allows the high heel tip to be positioned properly as the bottom leg is raised up and snugly grasps the tip, and prevents the grasping tool from engaging the leather portion of the heel. Once the high heel tip is snugly place within the grasping tool, the entire high heel tip is easily removed by a downward motion on the grasping tool with the fulcrum being at the slot within the support structure. Once the tip is removed, the new high heel tip can be easily inserted into the tip of the high heel.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
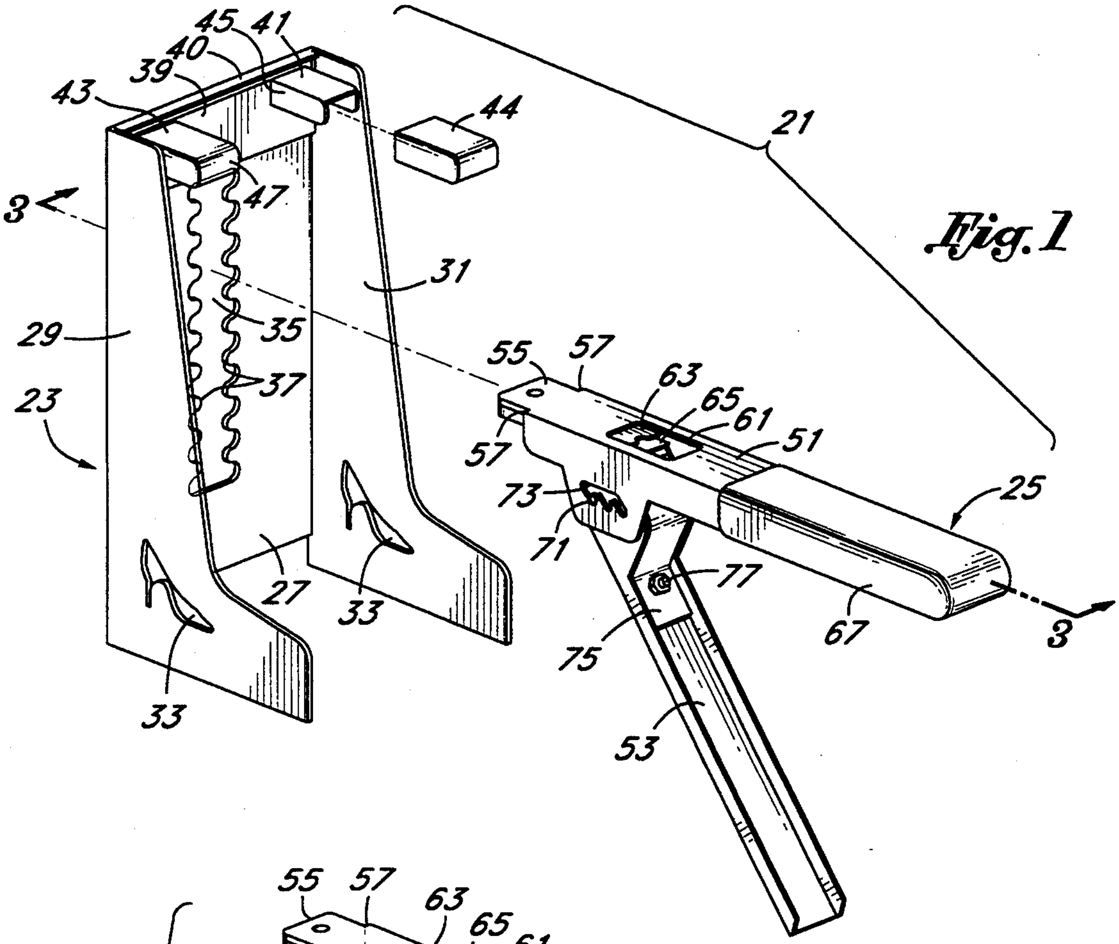
FIG. 1 is a perspective view of the tool of the present invention illustrating the adjustable grasping tool displaced from its support bracket into which it may be adjustably engaged.

The description and operation of the invention will be best described with reference to FIG. 1. FIG. 1 is a perspective view of the heel removal tool 21 illustrating a bracket 23 which is oriented to receive a grasping tool 25.

The bracket 23 may be made from two sheets of metal and bent to the proper shape. Bracket 23 includes a main planar portion 27 and a pair of side supports 29 and 31. An small outline of a high heeled shoe 33 is punched out of each of the side supports 29 and 31 to indicate the use of the heel removal tool 21.

Main planar portion 27 defines a slot 35 having symmetrical undulating opposed edges 37. The undulating edges 37 define a width in the slot 35 which alternates over the length of its height from a relatively wider width to a relatively narrower width.

Main planar portion 27 supports a fork assembly 39 at its upper portion. Fork assembly 39 fits just beneath a folded rim 40, and may be attached to main planar portion 27 by welding or other suitable method. The fork assembly 39 may be made from a single sheet of material, folded to form a pair of supports 41 and 43. Support 41 is shown uncovered, with a protective covering member 44 shown displaced from the support 41, uncovering the support 41. Note that the support 41 may be formed by folding it 90° from the main body of the fork assembly 39, and folding a pair of side flaps 45 to a 90° angle with respect to the main portion of the support 41.

Support 43 is shown as covered with a protective covering member 47. The protective covering member should provide soft support in a direction extending between the supports 41 and 43. As will be shown, it is in this region that the heal of a high heeled shoe will be wedgeably supported between the supports 41 and 43.

Grasping tool 25 includes a main upper handle 51 and a lower handle 53 which is pivotable with respect to the upper handle 51. The forward tip end of the grasping tool 25 includes a reinforced tab 55 bound by shoulders 57. The width of the tab 55 is slightly narrower than the relatively wider width areas of the slot 35, and will be vertically engaged by the relatively narrower areas of slot 35 which exist both below and above each of the relatively wider width areas of slot 35. The shoulders 57 limit the extent to which the tab 55 can be inserted into the relatively wider width areas of the slot 35.

The upper handle 51, defines an upper aperture 61, within which is a recessed first jaw 63, and just beneath and slightly to one side of first jaw 63, a support platform 65. Support platform 65 will limit the extent to which a high heel shoe tip can be placed through the upper aperture 61. A length of grip material 67 covers the rear end of the upper handle 51 to protect the hands and to provide a sure and comfortable grip.

Lower handle 53 has a pin 71 which engages a variable position slot 73 in the side of the upper handle 51. The variable position slot 73 has an upper elongate portion and a series of lower sub-slots which enable the pin 71 to occupy several positions. A more rearward position will allow a more open area in front of the first jaw 63 and a second jaw (not yet shown). In this manner, a large heel can be adjusted for to give a comfortable grip between the upper handle 51 and the lower handle 53 by moving the pin 71 to a rearward sub-slot in the variable position slot 73. Conversely, and a small heel can be adjusted for by moving the second jaw (not yet shown) forward for a given grip to enable a smaller heel tip to be grasped.

Figure 2:
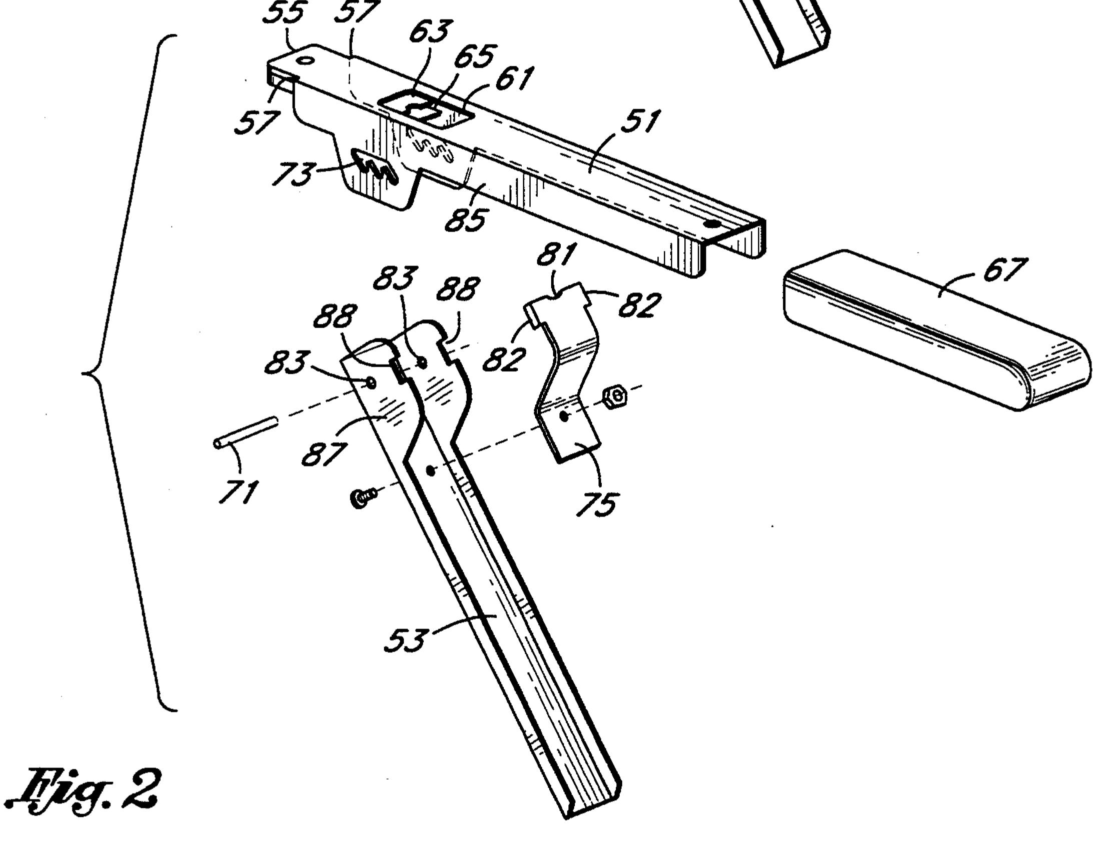
FIG. 2 is an exploded view of the grasping tool illustrated in FIG. 1 and illustrating its construction.

A base portion 75 of the second jaw is shown attached to the lower handle 53 with a bolt and nut combination 77. Referring to FIG. 2, an exploded view of the grasping tool 25 illustrates the second jaw 81. Second jaw 81 has a pair of side tabs 82 which will provide improved support as will be shown. Also the details of the bolt and nut combination 77 are shown in exploded format. The pin 71 is also shown engaging apertures 83 in both sides of the lower handle 53. Grip material 67 is shown removed from the upper handle 51 to illustrate that the upper handle 51 can be made from a single plate of metal. The full length of the sides 85 of the handle are shown a being folded and continuous with respect to the upper handle 51.

The pin 71 may preferably be a press fit pin. The fit between the extended area portion 87 of the lower handle 53 and the inside portion of the sides 85 of the upper handle 51 will not allow any twisting of the lower handle 51. Further, extending area portions 87 of the lower handle 53 each define a shallow slot 88 which slots 88 are engageable with respect to the shallow tabs 82. This gives direct force to the second jaw 81. With this configuration, the pin 71 will hold the lower handle 53 in place with respect to the upper handle and in any position in the variable position slot 73.

Figures 3, 4:
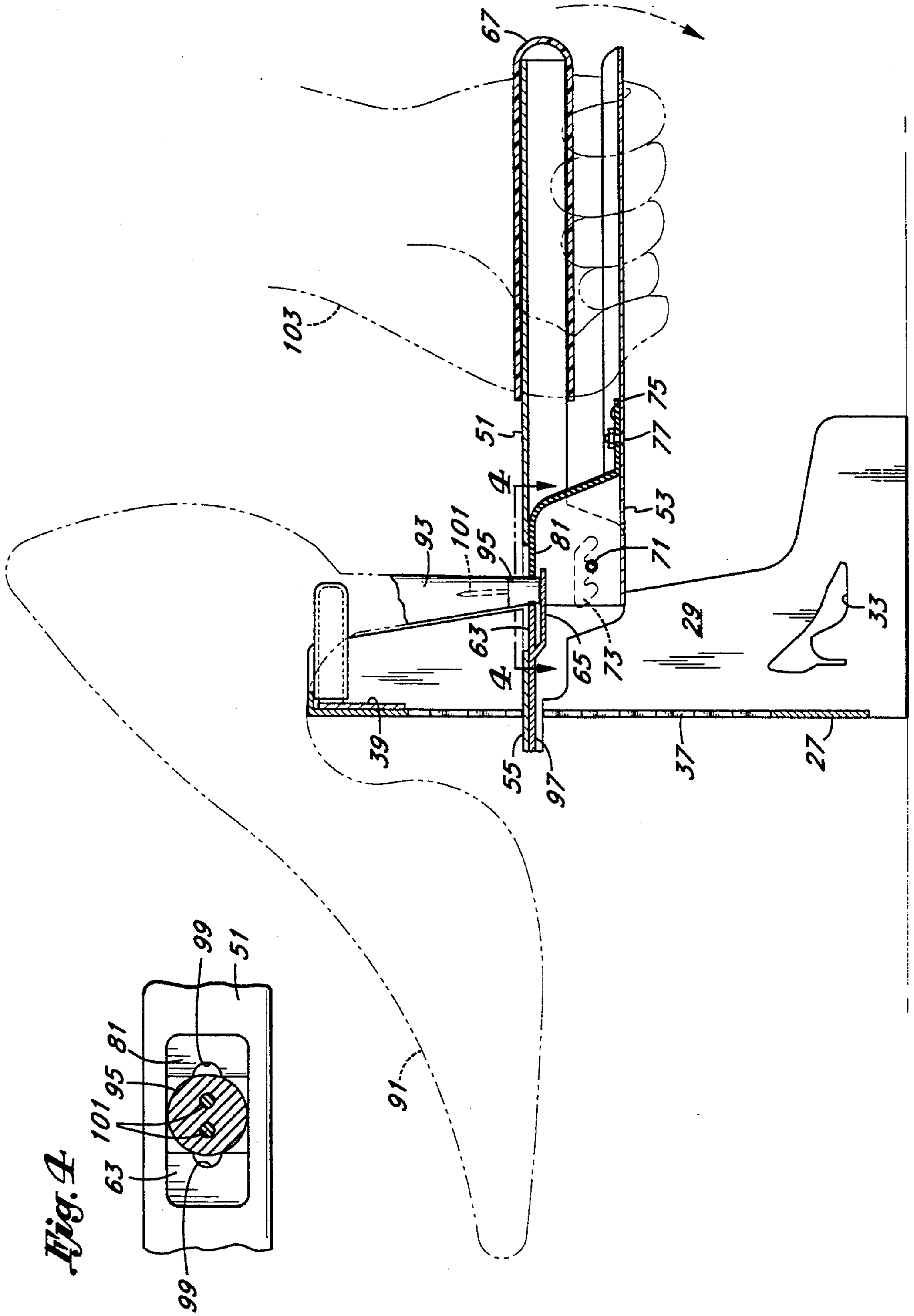
FIG. 3 is a side sectional view of the grasping tool of FIGS. 1 and 2 engaging the support bracket of FIG. 1 and shown in position to remove the high heel tip from a high heel shoe.
FIG. 4 is a top sectional view taken along line 4—4 of FIG. 3 and illustrating the manner in which the heel tip is engaged by the grasping tool.

Referring to FIG. 3, the structures seen in FIGS. 1 and 2 can be seen more clearly. FIG. 3 illustrates a shoe 91, shown in phantom, having a heel 93 and with a tip 95 which is to be removed. It can also be seen that the support platform 65 and the first jaw 63 are both supported from a single piece of base metal 97 which is secured to the under side of the grasping tool 25. Such an expanded area of support serves to make the grasping tool 25 extremely sturdy.

As can be seen in FIG. 4, when in proper position, the tip 95 is firmly grasped between the first jaw 63 and the second jaw 81. Both the first jaw 63 and second jaw 81 contain a notch 99. The edges of notch 99 more fully engage the tip 95, and can be used to more fully form closure about any central pins 101 which may be present where the tip 95 is worn away.

First, the shoe 91 is placed on the bracket 23 with the heel 93 positioned between the supports 41 and 43, and forward as close as possible to rim 40. The grasping tool 25 is brought forward to the slot 35, with the lower handle 53 in a downward, or open position. The grasping tool 25 tab 55 is inserted into one of the wide areas of the slot 35, while the tip 95 is fitted into the upper aperture 61 between the first and second jaws 63 and 81. The bottom of the tip is brought to rest on the support platform 65.

The lower handle 53 is then brought upwardly with the grasp of the hand 103 (also shown in phantom shown in FIG. 3). Next a sufficiently strong grip is achieved as the lower handle 53 is brought into contact with the upper handle 51. If the grip formed between the handles 51 and 53 is too wide, the handle 53 can be opened, and the pin 71 moved forward into a sub-slot in the variable position slot 73, to enable the handles 51 and 53 to be brought closer together for a given size tip. Conversely, if the grip formed between the handles 51 and 53 is too narrow, or if the handles touch before a good grasp is made, the handle 53 can be opened, and the pin 71 moved rearward into a sub-slot in the variable position slot 73, to enable the handles 51 and 53 to be brought farther apart for a given size tip.

Once a good grip is achieved, downward pressure is exerted on the upper handle 51, while maintaining the grip. The tip 95 will be pulled from the heel easily, and without damage to the heel 93. The upper aperture 61 of the grasping tool 25, and indeed the grasping tool 25 and bracket 23 can be sized to accommodate any size heel tips. A great advantage of the heel removal tool 21 is that the extractive forces are straight downward, in line with the strength of the heel 93. No twisting, or bending forces are applied to the heel 93, or its tip 95. This is important because the new tip 95 will be inserted using the same holes which secured the last tip 95. As a consequence, the holes should not be enlarged or torn, if they will be expected to secure the next tip 95.

While the present invention has been described in terms of a high heel tip removal device, one skilled in the art will realize that the structure and techniques of the present invention can be applied to many appliances. The present invention may be applied in any situation where a small part is sought to be rapidly and easily replaced with due consideration to insuring that the surrounding material and area is not damaged.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A removal tool comprising:

a self-standing bracket including
- a main planar portion defining a first series of areas interstitially bound by a second series of areas narrower with respect to said first series of areas;
- a pair of side supports supported by said main planar portion and at a planar angle with respect to said main planar portion; and
- a fork assembly supported by said main planar portion and extending at an angle with respect to said main planar portion;

a grasping tool pivotally engageable with said bracket, at least a portion of said grasping tool being interfittable within said first series of areas; and means, supported by said grasping tool, for grasping a first object and for providing force approximately normal to a plane of attachment of said first object with a second object.

2. The removal tool of claim 1 and further comprising protective material covering said fork assembly.

3. The removal tool of claim 1 wherein said fork assembly is formed from a single piece of material.

4. The removal tool of claim 1 wherein said bracket is formed from a single piece of material.

5. The removal tool of claim 1 wherein:

said grasping tool comprises a first handle defining a first aperture, a second handle pivotally supported by said first handle, and a tab supported by said first handle, said tab interfittable within said first series of areas of said main planar portion; and said means for grasping a first object comprises a first jaw supported by said first handle, and a second jaw supported by said second handle and pivotally moveable into position opposite said first jaw.

6. The removal tool of claim 5 and further comprising a support platform underneath said first jaw.

7. The removal tool of claim 5 wherein said first and said second jaws each further define a semicircular notch.

8. The removal tool of claim 5 wherein said second handle further defines an extended portion having a pair of shallow slots, and wherein said second jaw has an adjacent pair of tabs interfitted with said shallow slots of said extended portion.

9. The removal tool of claim 5 wherein at least one of said first and said second handles is covered by a grip material.

10. A removal tool comprising:

a bracket defining a main planar portion and a pair of side portions angled with respect to said main planar portion;

a vertically extending slot disposed in said bracket having symmetrical undulating opposed edges;

means, supported by said bracket, for supporting the heel of a high heel shoe; and a grasping tool comprising
- a first handle having a main surface and a pair of side surfaces extending at right angles with respect to said main first handle surface, said side surfaces defining a pair of variable position slots each having a series of sub-slots;
- a second handle having a main surface and extended area portions slidably fittable between said side surfaces of said first handle, said extended area portions defining a pair of co-axial apertures;
- a pivot pin engageable through said co-axial apertures and engageable with said variable position slots and said sub-slots;
- a first jaw supported by said first handle;
- a second jaw supported by said second handle and pivotally moveable into position opposite said first jaw; and
- a tab supported by said first handle, said tab interfittable within a pair of opposing outward undulations of said vertically extending slot.

11. The removal tool of claim 10 wherein said tab is bound on both sides by a pair of shoulders, said shoulders of sufficient width to prevent said removal tool from passing through said vertically extending slot.

12. The removal tool of claim 10 wherein said extended area portions of said second handle define a pair of shallow slots, and said second jaw comprises:

a base portion lying in a first plane and affixed to said second handle; and an upper jaw portion defining a pair of oppositely disposed tabs fittable within said shallow slots.

13. The removal tool of claim 10 wherein said means for supporting the heel of a high heel shoe comprises:

a pair of cantilevered members extending at an abrupt angle with respect to said main planar portion of said bracket, and spaced to prevent the heel of a high heel shoe from passing therebetween; and a protective covering covering each of said cantilevered members.

14. The removal tool of claim 13 wherein said pair of cantilevered members are formed from a single piece of material.

15. The removal tool of claim 10 wherein said bracket is formed from a single piece of material.

16. The removal tool of claim 10 and further comprising a support platform underneath said first jaw.

17. The removal tool of claim 10 wherein said first and said second jaws each further define a semicircular notch.

18. The removal tool of claim 10 wherein at least one of said first and said second handles is covered by a grip material.

19. A process of removing a high heel tip from a high heel shoe comprising the steps of:

bringing a high heel shoe to rest within a fork assembly of a bracket;

opening handles of a grasping tool;

bringing the grasping tool into pivotal contact with said bracket and bringing grasping jaws of said grasping tool into place surrounding said high heel tip;

grasping said handles to bring pressure to said grasping jaws of said grasping tool to clamp said high heel tip in said grasping jaws;

exerting pivoting pressure on said grasping tool with respect to said bracket to exert pulling forces on said high heel tip until said tip is removed from said high heel shoe.

* * * * *